(12) United States Patent
Martin

(10) Patent No.: US 7,162,808 B2
(45) Date of Patent: Jan. 16, 2007

(54) PRECISION CIRCLE CENTER FINDER AND MULTIFUNCTIONAL CONSTRUCTION TRADE TOOL

(76) Inventor: Roger Neil Martin, 1722 N. College Ave., Newton, NC (US) 28658

( * ) Notice: Subject to any disclaimer, the term of this patent is extended or adjusted under 35 U.S.C. 154(b) by 0 days.

(21) Appl. No.: 10/842,785

(22) Filed: May 12, 2004

(65) Prior Publication Data

US 2005/0252018 A1   Nov. 17, 2005

(51) Int. Cl.
*G01D 21/00* (2006.01)
*B43L 9/02* (2006.01)

(52) U.S. Cl. .................... 33/520; 33/286; 33/27.01

(58) Field of Classification Search ............... 33/1 B, 33/21.3, 27.01, 27.02, 27.03, 286, 392, 494, 33/516, 520, 529, 562, 563, 644, 679.1, 474, 33/476
See application file for complete search history.

(56) References Cited

U.S. PATENT DOCUMENTS

| | | | | |
|---|---|---|---|---|
| 824,299 A | * | 6/1906 | Huey | 33/27.03 |
| 1,118,067 A | * | 11/1914 | Smith | 33/474 |
| 2,166,650 A | * | 7/1939 | Townsend | 33/520 |
| 2,542,537 A | * | 2/1951 | Klemm | 33/27.03 |
| 2,624,117 A | * | 1/1953 | Paci | 33/27.03 |
| 2,857,674 A | * | 10/1958 | Feldhake | 33/27.03 |
| 3,015,889 A | * | 1/1962 | Godman | 33/27.03 |
| 3,795,053 A | * | 3/1974 | Burke | 33/1 B |
| 4,129,948 A | * | 12/1978 | Hatter et al. | 33/27.03 |
| 4,736,526 A | * | 4/1988 | Hsia | 33/27.03 |
| 5,125,161 A | * | 6/1992 | Guthrie | 33/27.03 |
| 5,615,485 A | * | 4/1997 | Stoneberg | 33/27.03 |
| 6,124,935 A | * | 9/2000 | Matthews | 33/286 |
| 6,467,179 B1 | * | 10/2002 | Wolf | 33/474 |

* cited by examiner

*Primary Examiner*—G. Bradley Bennett
(74) *Attorney, Agent, or Firm*—Monty Simmons

(57) ABSTRACT

A measuring instrument is described for application to the end of a circular member, such as a pipe, to locate the precise center of such circular member, and project it to a distant surface.

14 Claims, 6 Drawing Sheets

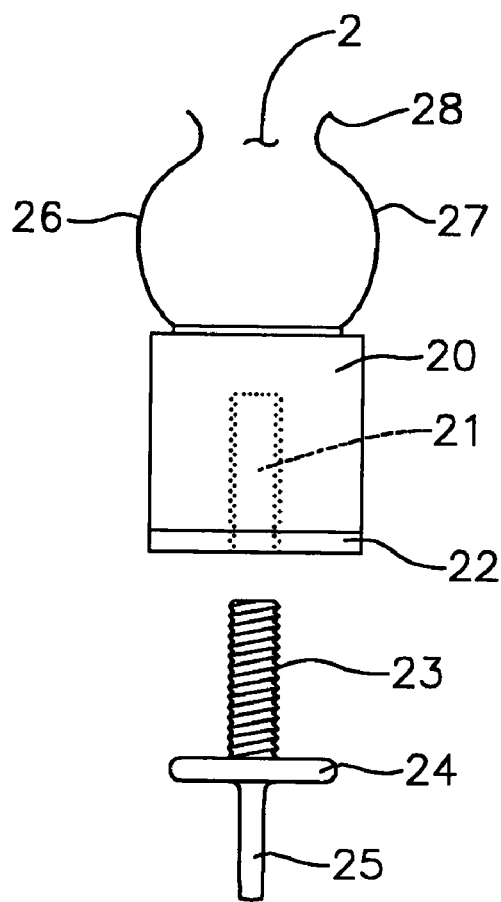
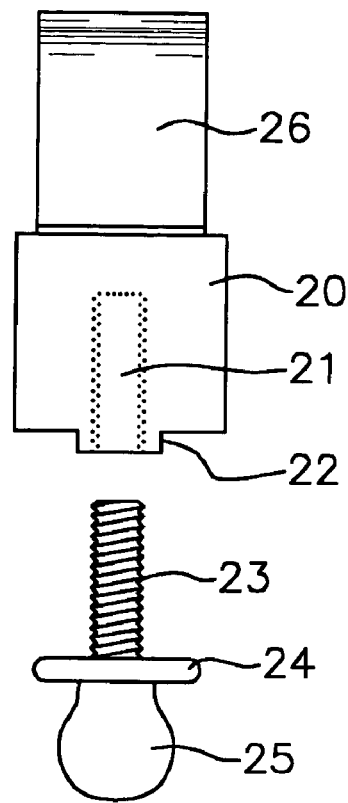
Fig. 3a    Fig. 3b
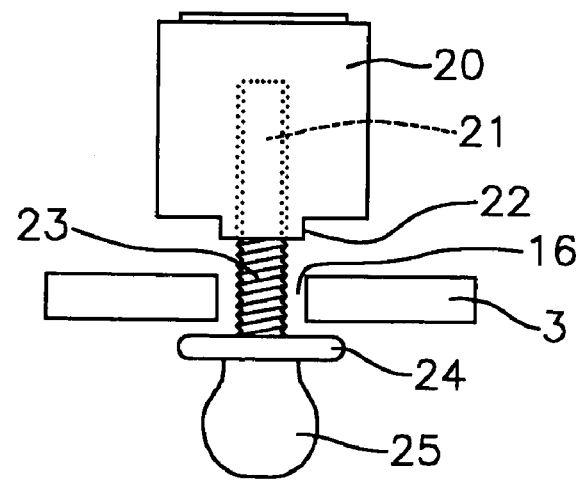
Fig. 4

PRECISION CIRCLE CENTER FINDER AND MULTIFUNCTIONAL CONSTRUCTION TRADE TOOL

FIELD OF THE INVENTION

This invention is directed to a measuring instrument which can be applied to the end of a circular member, such as a pipe, to locate the precise center of such circular member, and project it to a distant surface.

BACKGROUND OF THE INVENTION

Protractors and similar devices have long been used to locate the center of a circle, or a circular structure such as a tube or pipe. But such devices lack means to project that center from one surface to another, which creates some problems in the building trades.

One such problem, is where a plumbing pipe emerges from a hole in the ceiling and must extend downwardly therefrom through a space (the height of the room) and then pass through a corresponding hole in the floor beneath. It is desirable that the hole in the floor be the same size as the hole in the ceiling and directly beneath it. In the past this has generally been attempted by measuring the distance from adjacent walls. This is very imprecise because walls rarely plumb true and the multiple measurements inevitably result in some degree of error. So the hole in the floor ends up being considerably larger than the hole in the ceiling, and having undesirably large gaps between the hole and the pipe it is intended to accommodate.

The same problem arises, when a pipe emerges horizontally from a hole in one wall and must extend through a space (the length of the room) to pass through a corresponding hole in an adjacent wall.

It is, accordingly an object of the present invention to provide a device for determining the center of a pipe, which can also precisely project that center to a distant surface.

It is a further object of the invention to provide means for temporarily attaching such a device to the end of a pipe during the period of measurement.

It is a further object of the invention to provide the aforesaid device of a material which is rigid, but sufficiently flexible to fit around the curvature of a pipe.

DISCLOSURE OF THE PRIOR ART

Applicant is aware of no prior art which anticipates or is directly relevant to the present invention. Applicant is aware of the following prior art patents, which were noted in the course of a patent novelty search.

| | | | |
|---|---|---|---|
| U.S. Pat. No. | 2,542,537 | U.S. Pat. No. | 5,615,485 |
| U.S. Pat. No. | 4,129,948 | U.S. Pat. No. | 2,857,674 |
| U.S. Pat. No. | 2,624,117 | U.S. Pat. No. | 2,499,518 |
| U.S. Pat. No. | 2,428,310 | U.S. Pat. No. | 1,808,705 |
| U.S. Pat. No. | 1,492,811 | U.S. Pat. No. | 1,307,233 |
| U.S. Pat. No. | 1,154,673 | | |

BRIEF DESCRIPTION OF THE DRAWINGS

For the sake of brevity the Precision Circle Center Finder and Multifunctional Construction Trade Tool, is hereinafter referred to as "the instrument".

FIG. 3a is a side elevation view of a clip attachment that fits within the grooves of the instrument illustrated in FIG. 2

FIG. 3b is the same as FIG. 3a, but rotated 90°

FIG. 4 illustrates the clip attachment of FIGS. 3a and 3b in relation to a groove of the instrument illustrated in FIG. 2

SUMMARY OF THE INVENTION

In accordance with the present invention, an instrument is provided which can be held against the end of a pipe to precisely determine its center point. Clips can be added to instrument so that it can be temporarily attached to the end of a pipe. Spirit levels can be attached to the surface of the instrument to determine its relative horizontalness. A plumb line or laser pointer may extend from the center of the instrument so as to project that center point to a distant surface. The instrument can be made of a relatively rigid material which is yet sufficiently flexible to fit around curvature of a pipe.

DETAILED DESCRIPTION OF THE DRAWINGS

Reference will now be made to the preferred embodiment of the invention and alternate forms thereof, as illustrated in the accompanying drawings.

Figure 1:
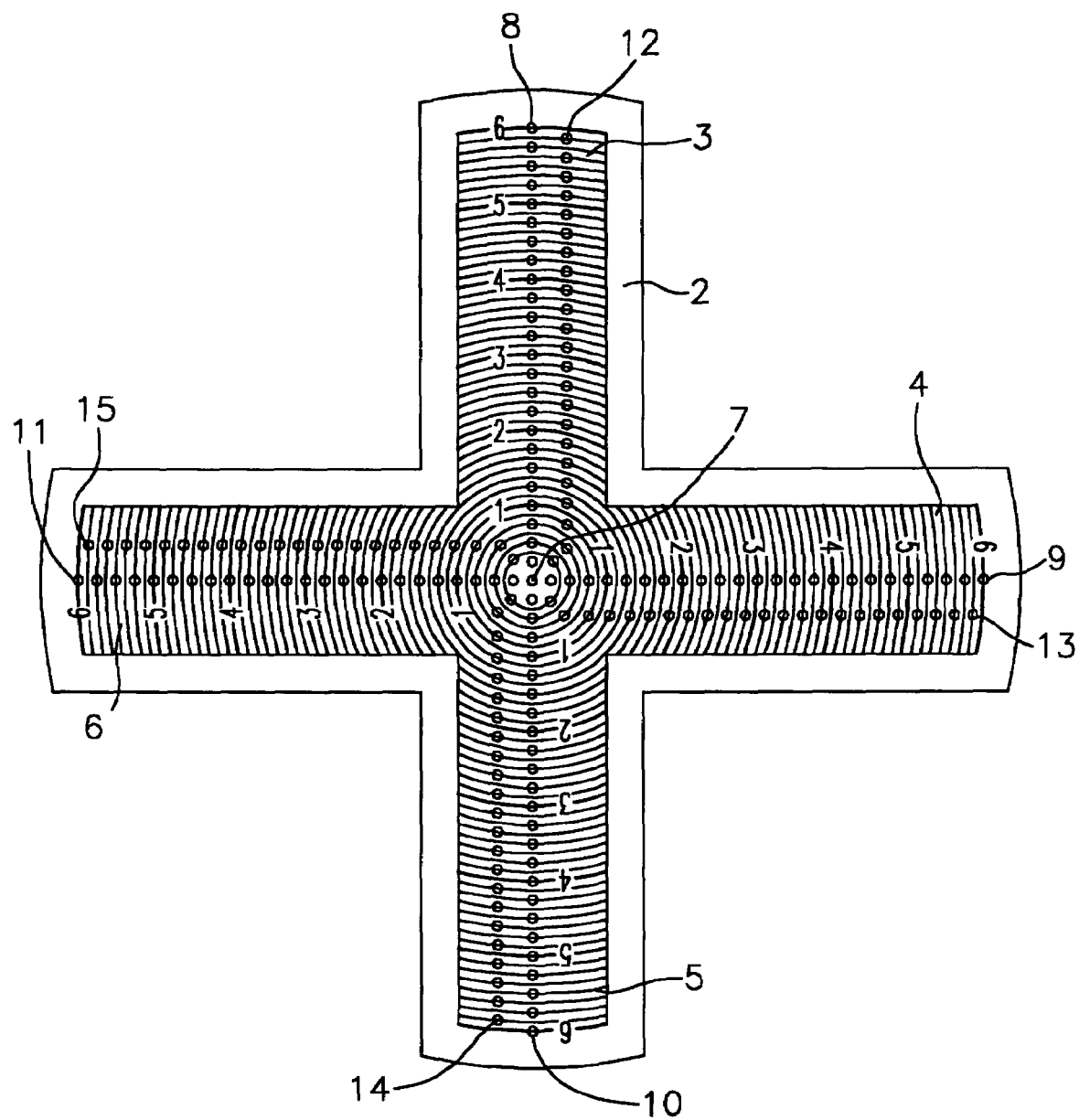
FIG. 1 is a side elevation view of the instrument.

As illustrated in FIG. 1, the instrument, in its most basic form, comprises a cross 2, having arms 3, 4 5 and 6. At the precise center of the cross 2, is center hole 7. An aligned series of holes 8, extend outwardly from center hole 7 on arm 3. Similar aligned series of holes 9, 10 and 11, extend outwardly from center hole 7 on arms 4, 5 and 6, respectively. A series of aligned holes 12 is provided adjacent to the series of holes 8 on arm 3. Each hole of series 12, is calculated to be precisely between two adjacent holes in series 8 holes. The adjacent series of holes 13, 14 and 15 extend outwardly on arms 4, 5 and 6 adjacent to series of holes 9, 10 and 11.

It will be appreciated that this arrangement of adjacent holes provides a virtual continuum of measurement holes, without compromising the structural integrity of the instrument. More specifically, if all the holes of series 8 and 12 were aligned in a single series, they would overlap one another and would comprise an extended slot rather than a series of holes.

Each of the holes 7 through 15, is just large enough to accommodate the point of a pencil, pen or other inscribing tool. By inserting a tack through center hole 7, or otherwise rotatably affixing it to a surface, the point of an inscribing tool can be inserted through one of the holes in the series of holes 8 through 15. The entire cross 2, can then be rotated around the center hole 7, to inscribe a circle of the dimension indicated by the specific hole (in series 8 through 15) through which the inscribing tool has been inserted.

The arms 3, 4, 5 and 6 are at right angles to one another. So the instrument cannot only determine the center of a pipe, but can be inverted to function as a square to measure the angularity of the pipe to the surrounding surface.

Figure 2:
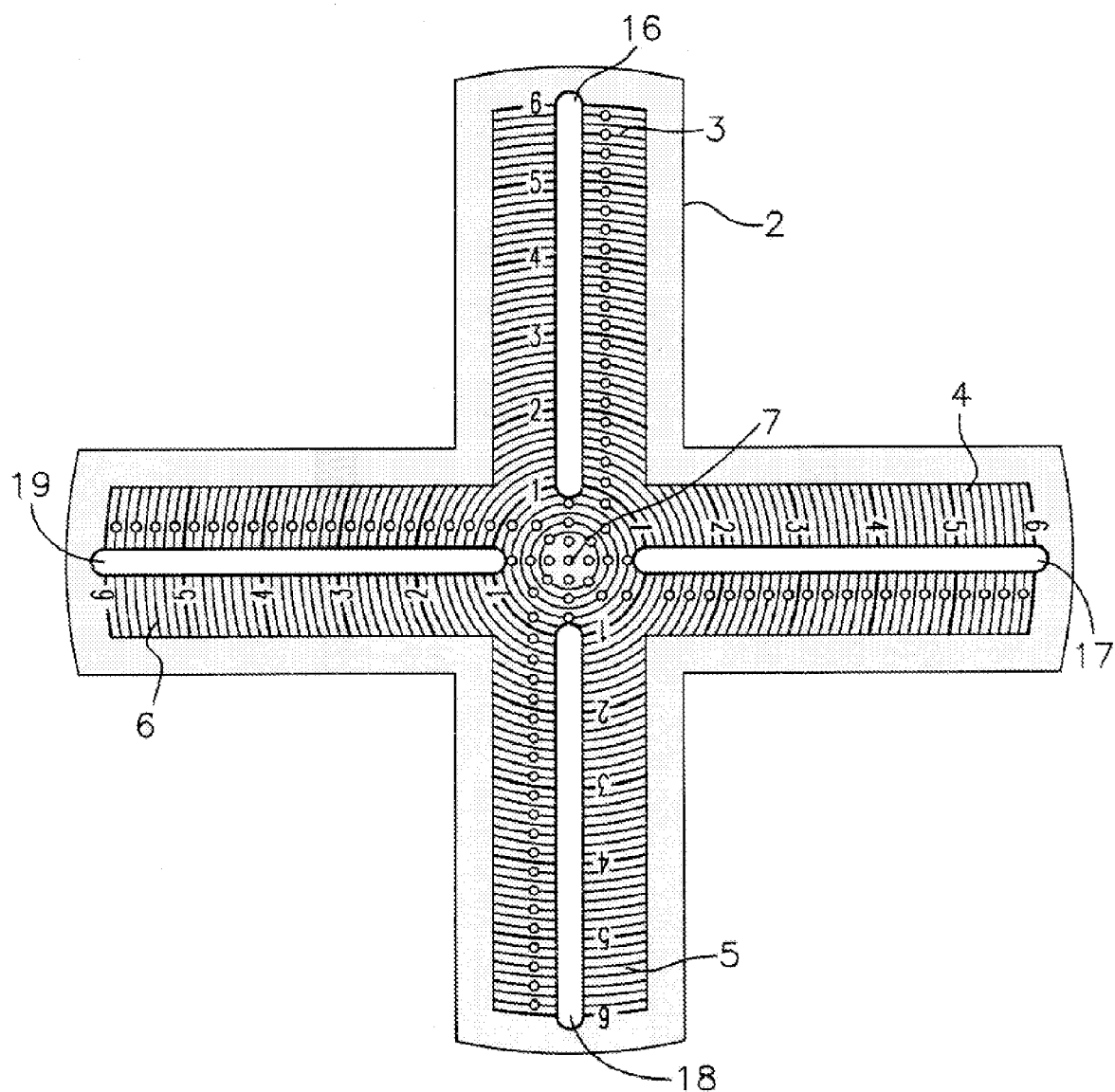
FIG. 2 is a side elevation view of an alternate form of the instrument with grooves formed therein.

In an alternate form of the instrument, shown in FIG. 2, slots 16, 17, 18 and 19 are formed respectively in arms 3, 4, 5 and 6. The slots 16, 17, 18 and 19 replace the aligned series of holes 8, 9, 10 and 11 illustrated in FIG. 1.

FIGS. 3a, 3b and 4 illustrate a clip attachment such as may fit into the slots 16, 17, 18 and 19. It comprises a solid metal body 20, having a threaded hole 21 extending up from its bottom and through most of its center. At the bottom of body 20, there is a boss 22 which is narrower than body 20 and calculated to fit within the slots 16, 17, 18 and 19. A threaded bolt 23 is provided with dimensions, and threads to screw into the threaded hole 21, through the boss 22. The threaded bolt 23, has a bolt head 24 which is three times wider than the bolt 23. A finger grip 25, extends outwardly from the bolt head 24 and accommodates the manual manipulation of screwing the threaded bolt 23 into and out of the threaded hole 21.

Attached to the top of clip attachment body 20, is the clip 26 which is formed of rigid but flexible material such as metal spring. The clip 26 includes two opposed inwardly bowed portions 27 which are integral with the two opposed outwardly bowed portions 28 formed on the top of "s" shaped configurations. The distance between the tops of the two outwardly bowed portions 28 forms the entrance 29 to the clip 26.

An application of the clip attachment to arm 3 of the instrument 2 is illustrated in FIG. 4. The boss 22 fits down into slot 16, as the threaded bolt 23 is screwed upwardly into the threaded hole 21. As the threaded bolt 23 is screwed upwardly into the threaded hole 21, the boss 22 is drawn down into the slot 16, until it is locked into place at the desired position.

In operation, the clip attachments are positioned in the slots 16, 17, 18 and 19 so that they precisely align with the outer periphery of the pipe. The instrument 2 is then pushed against the open end of the pipe, so that the entrances 29 pass over the pipe ends and are removably attached thereto.

The instrument 2, as illustrated in FIG. 1, has to be manually held in place to determine the center of the pipe and projections therefrom. The advantage of the form illustrated in FIG. 2, is that it can be clipped on to the end of a pipe and does not to be manually held in place.

Figure 5:
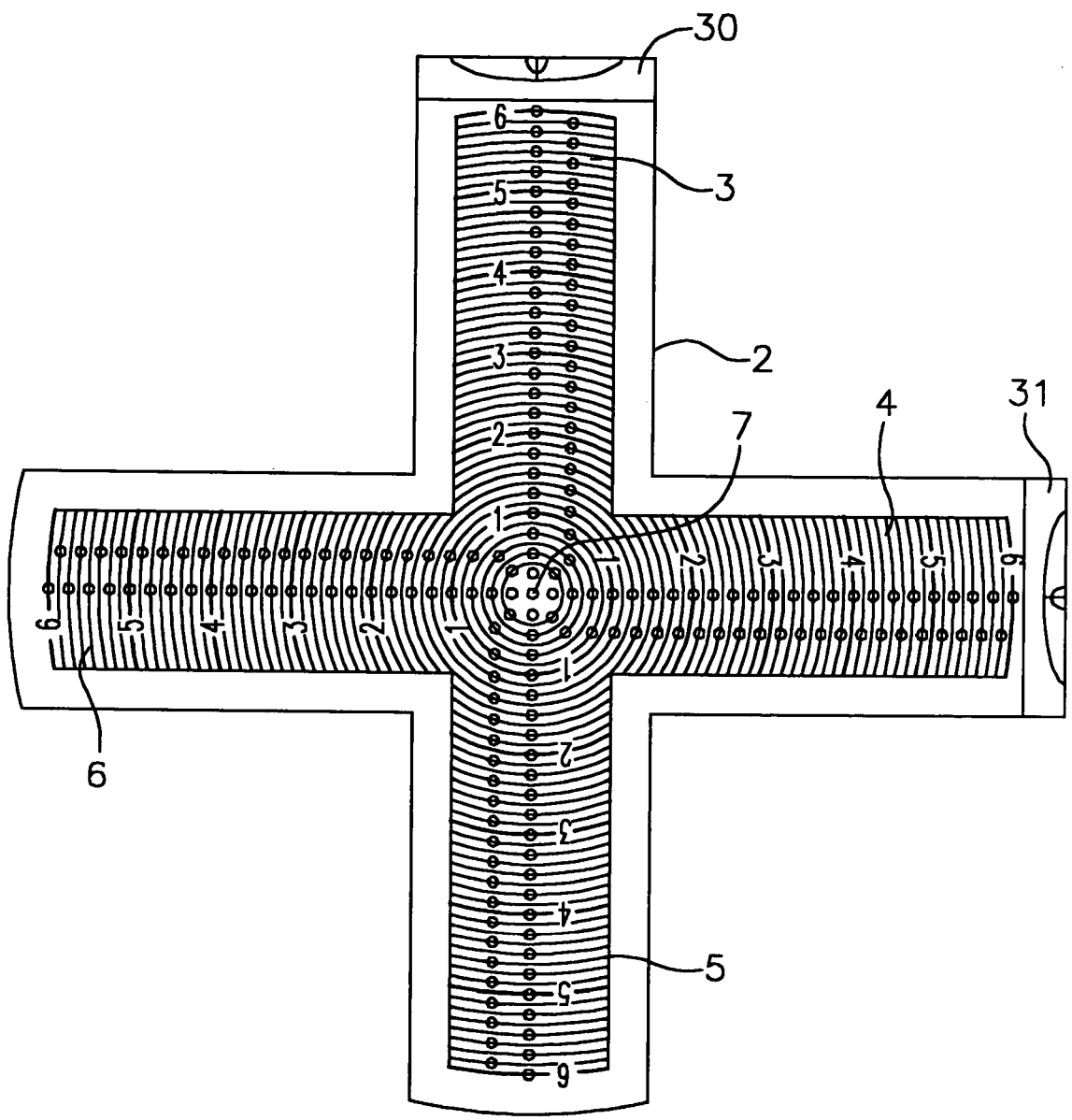
FIG. 5 is a side elevation view of an alternate form of the instrument having spirit levels mounted thereon.

A variation of the instrument is illustrated in FIG. 5. It is provided with spirit levels 30 and 31 on the arms 3 and 4. So provided, the instrument can not only determine the center of the pipe but also its relative horizontalness.

The instrument 2, when applied to a pipe extending downwardly can project its center to a lower distant surface (i.e., from ceiling to the floor beneath) by means of a plumb line hung from center hole 7 (not specifically illustrated in the drawings). This is a simple and inexpensive expedient, but applicable only to vertically downward projections.

Figure 6:
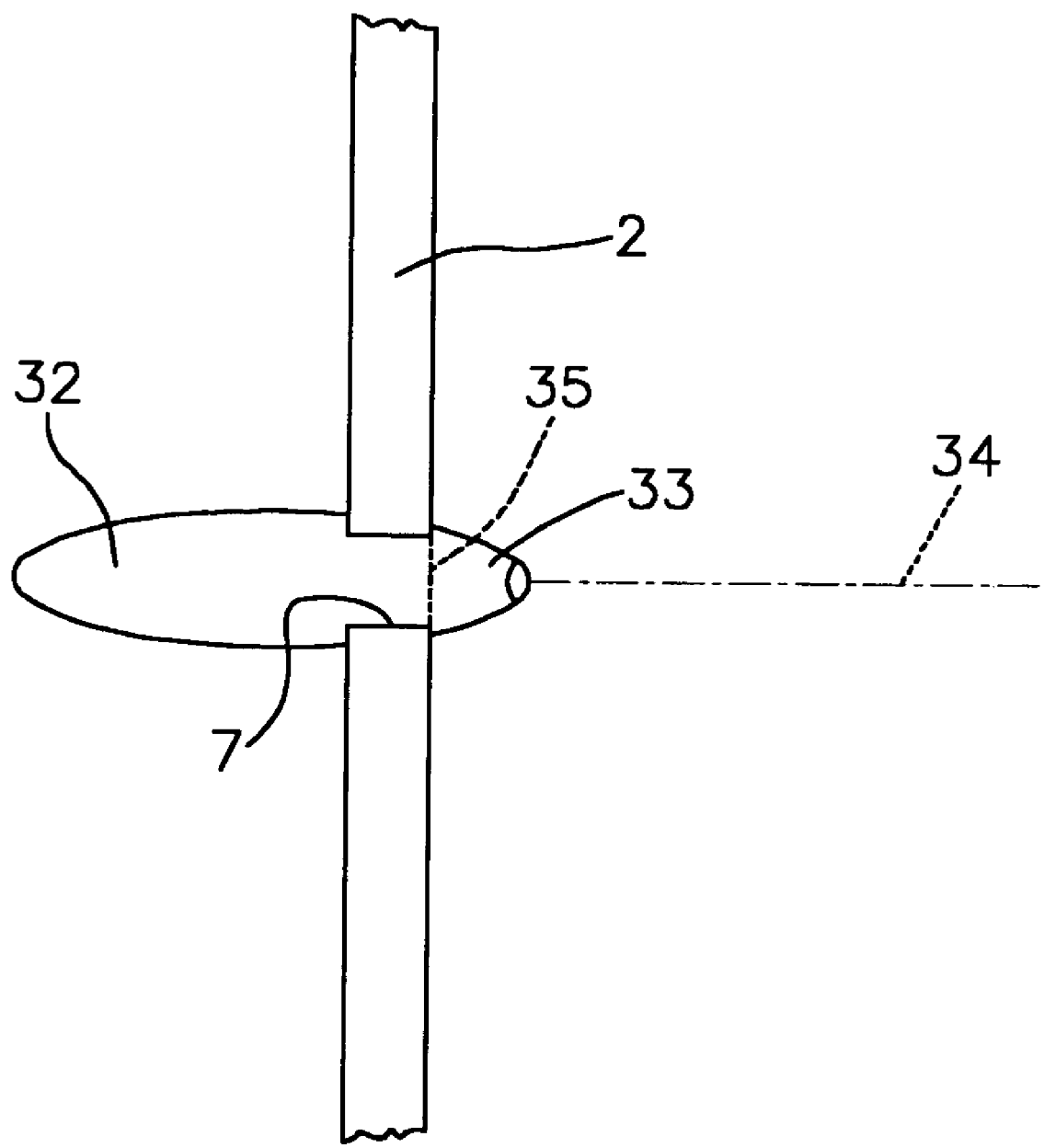
FIG. 6 is a cross sectional view illustrating an alternate form of the instrument, having a laser pointer mounted in the center thereof.
Figure 7:
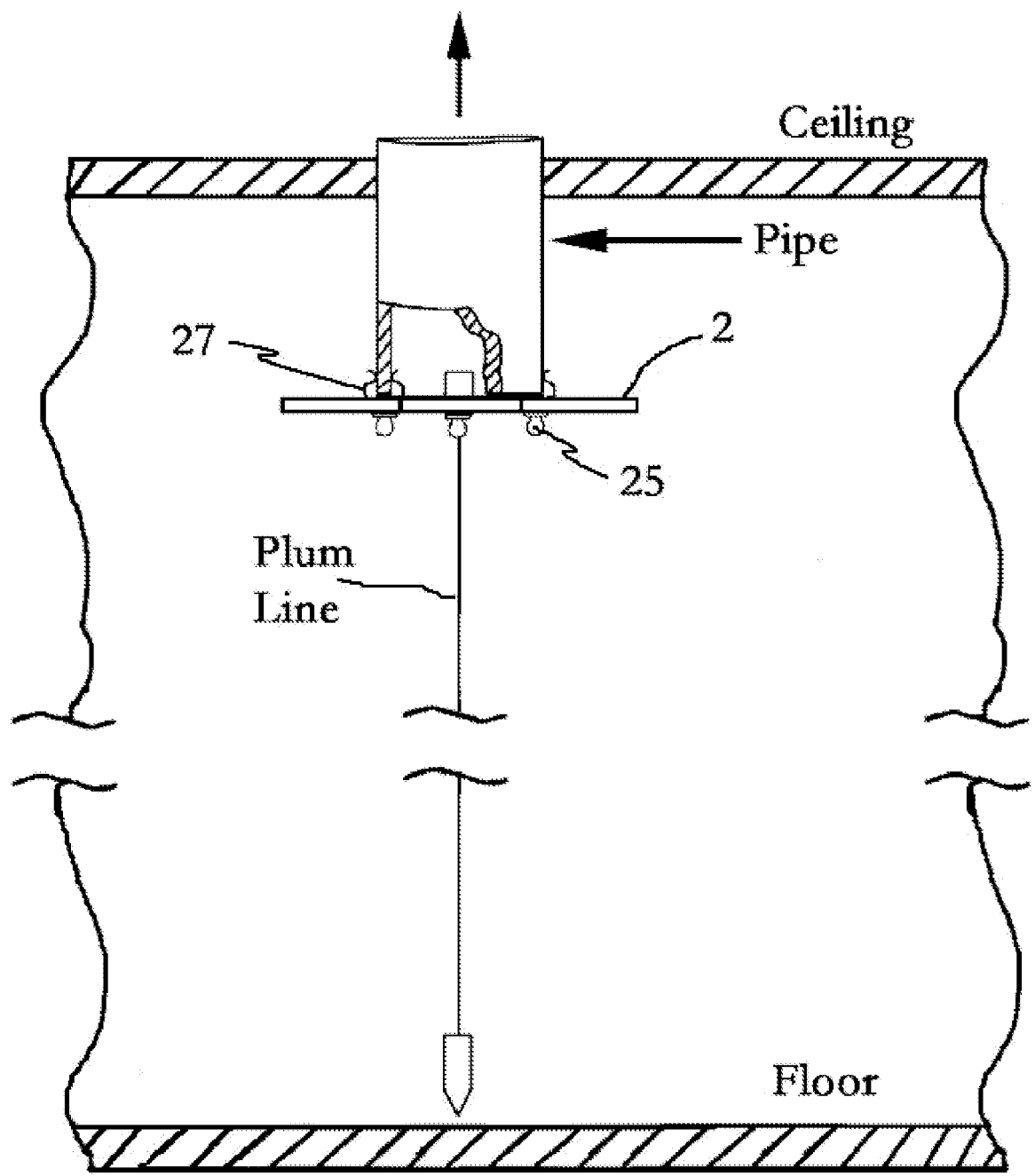
FIG. 7 is a side view of one embodiment of the invention associated with the end of a pipe extending from a ceiling with the pipe having a partial cut away section to show the interior clips and with a plumb line extending from the center of the pipe to a distant surface.

FIG. 6 illustrates a variant form of the instrument that provides a means for projecting the center of a pipe horizontally to a distant surface. The instrument 2 is provided at its center hole 7 with a laser pointer comprised of a laser pointer body 32 and laser pointer head 33. The laser pointer body 32 is attached to laser pointer head 33 at joint 35 in such a way as to secure it in a horizontally stable position within and relative to the center hole 7. In this position the laser pointer can project a beam 34 to an adjacent hoizontal surface, to precisely identify the center of a pipe on such a distant horizontal surface.

The instrument 2 as described above is made of very rigid material such as metal plate, clear plastic plate at least ⅛ inch thick. However, in one variation of the invention (not illustrated in the drawings), the instrument 2 is made of a relatively rigid material which is not yet sufficiently flexible to fit around the curvature of a pipe. The material is aluminum sheet or plastic sheet ¹⁄₁₀ a centimeter thick. The instrument in this form can be applied to the side of a pipe to identify the center and periphery of a nipple, that is a smaller pipe extending from the side of the pipe.

It will be further apparent to those skilled in the art that various modifications and variations can be made in the device and method of the present invention without departing from the spirit or scope of the invention. Thus, it is intended that the present invention cover the modifications and variations of this invention provided they come within the scope of the appended claims and their equivalents.

What is claimed is:

1. An instrument for determining the precise center of a circular member and projecting that determined center to a distant surface comprising:
   a cross shaped body with four arms projecting outwardly from a center hole slots formed in each of said arms and extending outwardly at right angles to one another from said center hole;
   clip attachments movably mounted in said slots;
   means to temporarily secure said clip attachment at precise positions within said slots;
   means to temporarily attach said clip attachments to the peripheral end of said circular member;
   means for projecting said center hole to a distant surface.

2. The instrument of claim 1, wherein said means for projecting comprises a plumb line.

3. The instrument of claim 1 wherein said means for projecting comprises a laser pointer.

4. The instrument of claim 1, which includes a spirit level mounted on one or more of said arms.

5. The instrument of claim 1, wherein the said cross shaped body is formed of a material which is rigid but sufficiently flexible to fit around the curvature of said circular member.

6. The instrument of claim 1, wherein said circular member is a pipe.

7. The instrument claim 1, wherein said circular member is a pipe.

8. An apparatus for determining the center of a circular member and projecting that determined center to a distant surface comprising:
   a body defining a center hole, said body having four arms projecting outwardly from said center hole with adjacent arms extending outwardly at right angles relative to each other,
   wherein each arm defines a slot beginning at a predefined distance from said center hole with each slot extending outwardly from said center hole and running along its respective arm with adjacent slots extending outwardly at right angles relative to each other;
   a position marker movably associated with each slot wherein said position marker is configured to be secured at selected positions along its respective slot;
   a securing-mechanism associated with each position marker and configured to temporarily associate each respective position marker with the peripheral end of said circular member thereby placing said center hole in substantial alignment with the center of said circular member thereby defining a determined center; and wherein said body is configured to receive a mechanism for projecting the determined center to a distant service.

9. The instrument of claim 8, wherein said position marker comprises a clip attachment.

10. The instrument of claim 8, wherein the said body is formed of a material which is rigid but sufficiently flexible to fit around the curvature of said circular member.

11. The instrument of claim 8, wherein said circular member is a pipe.

12. The instrument of claim 8, wherein each arm comprises a series of distant markers extending from said center hole and along said slot with each distant marker defining a precise distance from said center hole.

13. The instrument of claim 12, wherein said distant markers comprise a plurality of holes positioned along said arm and in alignment with said center hole with each hole having a predefined distance from said center hole.

14. An multifunctional instrument for performing a plurality of geometric functions including squaring functions and determining the center of a circle, said instrument comprising:

a cross shaped body with four arms projecting outwardly at right angles from a center hole so that the right angle defined by any two adjacent arms may be used to perform a squaring function;

wherein each arm defines a plurality of holes positioned along said arm and in alignment with said center hole with each hole having a predefined distance from said center hole;

wherein each hole defined by any one arm has a corresponding hole defined by at least one other arm; and wherein said plurality of holes for any two adjacent arms extend outwardly at right angles to one another so that said plurality of holes can be used to perform a plurality of geometric functions including determining the center of a circle.

* * * * *